United States Patent
Steiger et al.

(10) Patent No.: US 7,542,502 B2
(45) Date of Patent: Jun. 2, 2009

(54) THERMAL-EXPANSION TOLERANT, PREIONIZER ELECTRODE FOR A GAS DISCHARGE LASER

(75) Inventors: Thomas D. Steiger, San Diego, CA (US); Richard C. Ujazdowski, Poway, CA (US)

(73) Assignee: Cymer, Inc., San Diego, CA (US)

( * ) Notice: Subject to any disclaimer, the term of this patent is extended or adjusted under 35 U.S.C. 154(b) by 190 days.

(21) Appl. No.: 11/237,535

(22) Filed: Sep. 27, 2005

(65) Prior Publication Data

US 2007/0091972 A1  Apr. 26, 2007

(51) Int. Cl.
*H01S 3/097* (2006.01)
(52) U.S. Cl. .................. 372/86; 372/87; 372/88
(58) Field of Classification Search .............. 372/86, 372/82, 55–65, 87; 422/186.18; 96/16; 313/583
See application file for complete search history.

(56) References Cited

U.S. PATENT DOCUMENTS

| | | | | |
|---|---|---|---|---|
| 4,292,600 A | * | 9/1981 | Neracher | 372/84 |
| 4,613,971 A | * | 9/1986 | Brumme et al. | 372/87 |
| 4,703,490 A | * | 10/1987 | Brumme et al. | 372/86 |
| 4,718,072 A | * | 1/1988 | Marchetti et al. | 372/86 |
| 5,200,970 A | * | 4/1993 | Klopotek | 372/55 |
| 5,239,553 A | * | 8/1993 | Ono et al. | 372/58 |
| 5,337,330 A | * | 8/1994 | Larson | 372/86 |
| 5,694,284 A | * | 12/1997 | Oda et al. | 361/119 |
| 5,719,896 A | * | 2/1998 | Watson | 372/86 |
| 5,818,865 A | | 10/1998 | Watson et al. | 372/86 |
| 5,847,494 A | * | 12/1998 | Bayliss et al. | 313/231.31 |
| 5,875,207 A | * | 2/1999 | Osmanow | 372/86 |
| 6,067,003 A | * | 5/2000 | Yang | 337/28 |
| 6,433,482 B1 | * | 8/2002 | Curry et al. | 313/637 |
| 6,522,679 B1 | * | 2/2003 | Strowitzki et al. | 372/87 |
| 6,587,718 B2 | * | 7/2003 | Talpade | 604/21 |
| 6,618,422 B2 | | 9/2003 | Bragin et al. | 372/86 |
| 6,650,679 B1 | * | 11/2003 | Bragin et al. | 372/87 |
| 6,757,315 B1 | * | 6/2004 | Bragin et al. | 372/57 |
| 6,774,566 B2 | * | 8/2004 | Honda et al. | 313/634 |
| 6,937,635 B2 | * | 8/2005 | Morton et al. | 372/55 |
| 6,950,453 B2 | * | 9/2005 | Biswas et al. | 372/82 |
| 2005/0134180 A1 | * | 6/2005 | Ikeuchi | 313/633 |
| 2005/0194906 A1 | * | 9/2005 | Fujioka | 313/635 |
| 2005/0226301 A1 | | 10/2005 | Partlo et al. | 372/59 |

\* cited by examiner

*Primary Examiner*—Minsun Harvey
*Assistant Examiner*—Joshua King
(74) *Attorney, Agent, or Firm*—Matthew K. Hillman

(57) ABSTRACT

A corona-discharge type, preionizer assembly for a gas discharge laser is disclosed. The assembly may include an electrode and a hollow, dielectric tube that defines a tube bore. In one aspect, the electrode may include a first elongated 0o conductive member having a first end disposed in the bore of the tube. In addition, the electrode may include a second elongated conductive member having a first end disposed in the bore and spaced from the first end of the first conductive member. For the assembly, the first and second conductive members may be held at a same voltage potential.

19 Claims, 3 Drawing Sheets

THERMAL-EXPANSION TOLERANT, PREIONIZER ELECTRODE FOR A GAS DISCHARGE LASER

FIELD OF THE INVENTION

The present invention relates to pulsed, gas discharge lasers. The present invention is particularly, but not exclusively useful as a gas discharge laser having a corona discharge preionizer to reduce discharge instabilities.

BACKGROUND OF THE INVENTION

In the absence of preionization, gas discharge pulsed lasers such as ArF, XeF and KrF excimer lasers and molecular fluorine lasers are generally unstable. In particular, without preionization, the glow discharge that is required for suitable laser emission does not occur. On the other hand, preionization which results in a uniform distribution of electrons in the gas discharge region immediately before the main gas discharge occurs can be used to produce high quality, consistent laser pulses.

Early attempts at preionization included the use of spark preionization which created a high current, localized, intense spark which had the undesirable effect of vaporizing electrode material and consuming and contaminating the active laser gas. More recently, non-sparking corona discharge preionization has been developed and employed to create a substantially uniform emission of radiation which typically includes UV and X-ray wavelengths. Corona discharge producing a uniform preionization can result in a good beam profile without hot spots, high energy stability, improved electrode lifetimes and reduced halogen consumption. In one such method, a corona discharge is produced by establishing a potential difference across a dielectric material.

In more geometrical terms, a typical gas discharge laser may employ a pair of spaced apart, elongated (e.g. 60 cm long) main discharge electrodes to initiate lasing in a gaseous material. A blower may be provided to circulate a laserable gaseous medium past the electrodes to quickly exhaust gas from the discharge region after a pulse and present a fresh portion of gas to the electrodes for the next pulse. Thus, a rather large elongated, somewhat rectangular discharge volume of fresh gaseous media is required to be uniformly preionized, immediately prior to a discharge between the main electrodes.

For the above described geometry, an effective way to create a substantially uniform preionization generally involves the use of an elongated tube made of dielectric material that is aligned parallel to the discharge electrodes and positioned near the discharge region. A conductive preionization electrode (typically made of copper or brass), can then be placed in the bore of the tube and used to create a potential difference between the preionization electrode and one of the main discharge electrodes. This potential difference extends across the dielectric tube radially and results in a substantially uniform emission of photons that are emitted from the outer surface of the tube.

In one arrangement, an aluminum chamber housing is employed that envelops the gaseous media and the discharge region. Each end of the preionization electrode is then mechanically, and in some cases, electrically connected to the housing, which is then grounded. Thus, a potential difference between the preionization electrode and a main electrode is established when the main electrode is biased relative to ground.

An important factor that must be considered when designing a preionization system is the response of the various preionization structures to heat generated in the laser chamber. With the above described structure, one primary failure mode has been identified as the cracking of the relatively brittle dielectric tube due to thermal expansion of the brass/copper preionization electrode. In particular, both of these materials have a relatively high linear thermal expansion coefficient (LTEC) (i.e. the fractional change in length of a bar per degree of temperature change). For example, Brass has an LTEC, of about $19 \times 10^{-6}$ per degree Celsius and Copper has a LTEC of about $17 \times 10^{-6}$ per degree Celsius, as compared to aluminum which has an LTEC, of about $23 \times 10^{-6}$ per degree Celsius. In operation, the preionization electrode is typically heated to a higher temperature than the aluminum housing, and as a consequence, the preionization electrode may expand much more than the stainless steel housing upon exposure to heat, and this expansion differential may cause the electrode to bow and crack the dielectric tube.

With the above considerations in mind, Applicants disclose preionization systems and methods for providing a substantially uniform preionization volume while accommodating the heat generated in the laser chamber.

SUMMARY OF THE INVENTION

A preionizer assembly for a gas discharge laser may include an electrode and a dielectric tube that defines a tube bore. In one aspect, the electrode may include a first elongated conductive member having a first end disposed in the bore of the tube. In addition, the electrode may include a second elongated conductive member having a first end disposed in the bore and spaced from the first end of the first conductive member. For the assembly, the first and second conductive members may be held at a same potential.

In a particular embodiment, a portion of the first member may be formed as a rod defining a longitudinal axis and the first end of the first member may be formed with a substantially cylindrical shaped opening that is aligned with the longitudinal axis and has an inner diameter, D. For this embodiment, a portion of the second member may be formed as a rod and the first end of the second member may be formed with a substantially cylindrical shaped projection having outer diameter, d, with d<D. With this structure, at least a portion of the substantially cylindrical shaped projection may be disposed within the substantially cylindrical shaped opening.

DETAILED DESCRIPTION OF PREFERRED EMBODIMENTS

Figure 1:
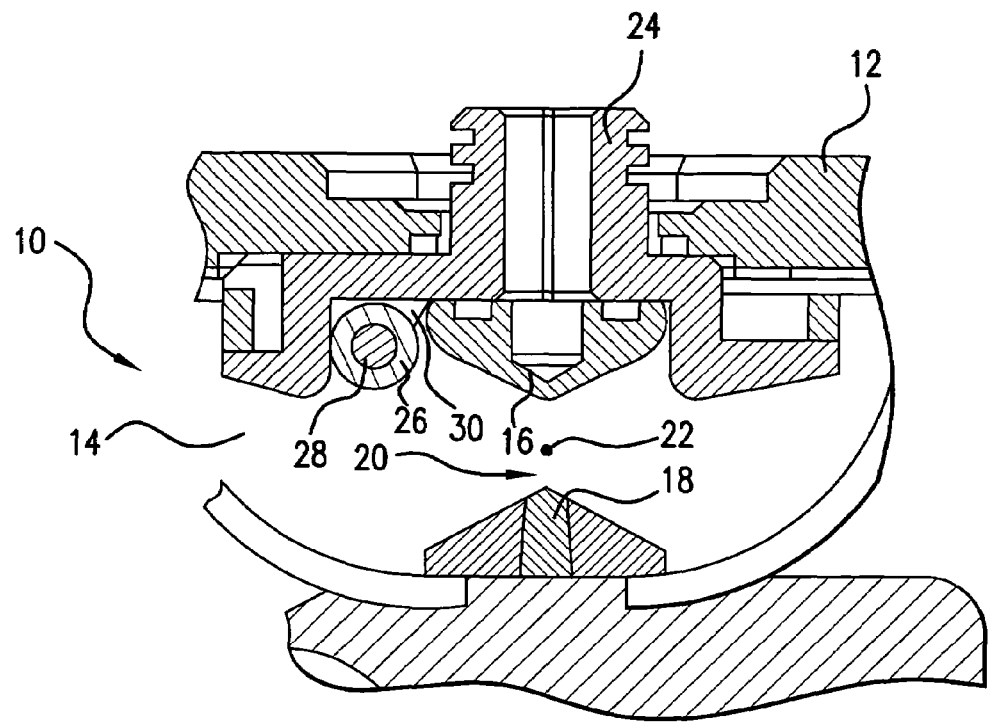
FIG. 1 shows a cross-sectional view of a gas discharge laser chamber taken transverse to a laser axis.

Referring initially to FIG. 1, a gas discharge chamber for a pulsed laser, such as a KrF excimer laser, an XeF excimer laser, an ArF excimer laser or molecular fluorine laser, is shown and generally designated 10. The chamber 10 typically includes a chamber housing 12 that may be made of a relatively strong, corrosion resistant material, e.g. nickel-plated aluminum, and is generally rectangular in construction with closed ends. With this structure, the housing 12 may surround a volume 14 which holds a laserable gas medium.

The chamber 10 may also include a gas discharge system having two elongated spaced apart electrodes 16, 18, one of which may be designated a cathode and the other an anode. With this arrangement, a gas discharge region 20 is established in the space between electrodes 16, 18 and includes the laser's beam axis 22 which extends substantially normal to the page for the chamber 20 shown in FIG. 1. Each electrode 16, 18 may be elongated, for example, to a length of about 40 -80cm and aligned in a direction generally parallel to the axis 22. Thus, the gas discharge region 20 for the chamber 10 shown is an elongated volume having a length approximating the length of the electrodes 16, 18 (i.e. 40-80 cm) and a somewhat rectangular cross section, which may be, for example, 3 mm wide by about 12 mm in the direction of electrode spacing for an ArF excimer laser. As shown, electrical contact between the electrode 16 and housing 12 is prevented by main insulator 24 which may be made from a dielectric, e.g. ceramic material. In one implementation, electrode 18 is maintained at a constant reference potential, e.g. ground potential, and electrode 16 can be biased relative to the reference potential to initiate an electric discharge in the gas discharge region 20. It is to be appreciated that other biasing schemes are possible.

Figure 2:
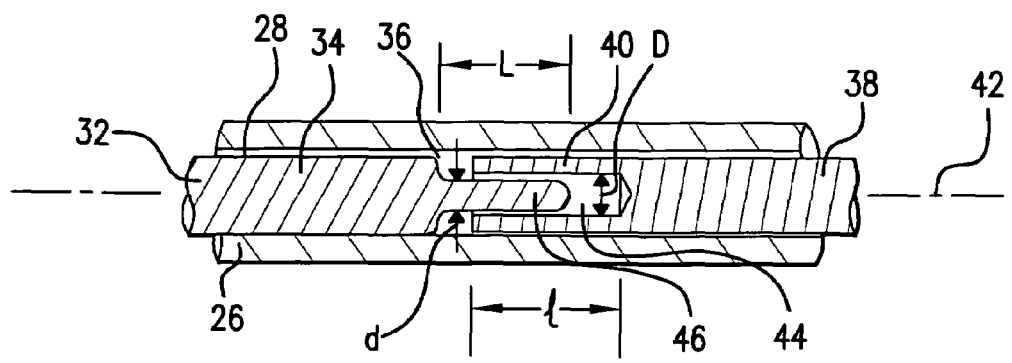
FIG. 2 shows a cross-sectional view of a portion of a preionization system having a preionization electrode that includes two elongated conductive members.

FIG. 1 also shows that the chamber 10 also includes a preionization system having a hollow, dielectric tube 26, preionization electrode 28 and a conductive shim 30, which is not required for all embodiments. FIG. 2 shows that the preionization electrode 28 may include an elongated conductive member 32 having an end 34 that is disposed within the bore 36 of the dielectric tube 26, and an elongated conductive member 38 having an end 40 that is disposed within the bore 36 of the dielectric tube 26. Also shown, members 32, 38 are aligned along a common axis 42 within the tube 26. At least one, and typically both of the members 32, 38 are disposed in the bore 36 of the tube 26 such that the member 32, 38 is able to move axially relative to the tube 26. For the preionization system, the members 32, 34 may be made from a conductive material such as brass or copper and the dielectric tube 26 may be made of a ceramic.

FIG. 2 further illustrates that the end 34 of the member 32 is axially spaced from the end 40 of the member 38 allowing axial movement of member 32 relative to member 38, for example, during thermal expansion of one or both of the members 32, 38. For the embodiment shown in FIG. 2, the end 40 of the member 38 is formed with a substantially cylindrical shaped opening 44 that is substantially aligned with axis 42. In addition, for this embodiment, the end 34 of the member 32 is formed with a substantially cylindrical shaped projection 46. In terms of relative proportions, for the structure shown, the opening 44 has an inner diameter, D, and the projection 46 has an outer diameter, d, with d<D to allow the projection 46 to fit inside and move within the opening 44. It is to be appreciated that incidental contact between the end 34 and end 40 may occur while maintaining an axial space to accommodate axial expansion. Exemplary length dimensions for the opening 44 and projection 46 may include, for example, L=1.1 cm and l=1.0 cm. With this cooperation of structure, as characterized by the axial overlap of the first and second members 30, 32 at the respective ends 34, 40, a relatively uniform preionization emission may be obtained near the ends 34, 40 of the members 30, 32.

Figure 3:
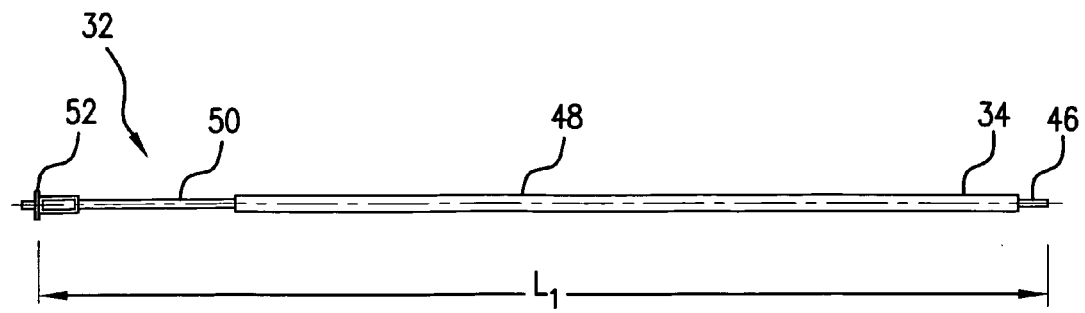
FIG. 3 shows a full length side view of a first conductive member for use in the electrode shown in system shown in FIG. 2.

FIG. 3 shows the full length of the member 32. As shown there, the member 32 includes a substantially cylindrical, rod portion 48 (having an outer diameter slightly less than the inner diameter of the tube 26) and a projection 46 which extends therefrom at end 34. The member 32 may also include a portion 50 having a reduced section (relative to the rod portion 48) to reduce arcing and a flange 52 for mounting the member 32 to a housing wall (not shown). The member 32 may have an overall length, $L_1$, of about 34 cm for use with an electrode 16 having a length of about 57 cm.

Figure 4:
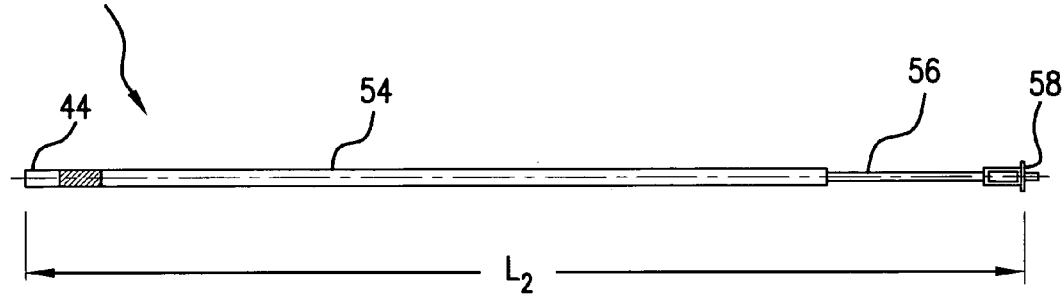
FIG. 4 shows a full length side view (in partial cross-section) of a second conductive member for use in the electrode shown in system shown in FIG. 2.

FIG. 4 shows the full length of the member 38. As shown there, the member 38 includes a substantially cylindrical, rod portion 54 (having an outer diameter slightly less than the inner diameter of the tube 26) and an opening 44 which is formed at end 40. The member 38 may also include a portion 56 having a reduced section (relative to the rod portion 54) to reduce arcing and a flange 58 which may mate with the dielectric tube 26 to prevent rotation. The member 38 may have an overall length, $L_2$, of about 33.5 cm for use with an electrode 16 having a length of 57 cm.

Figure 5:
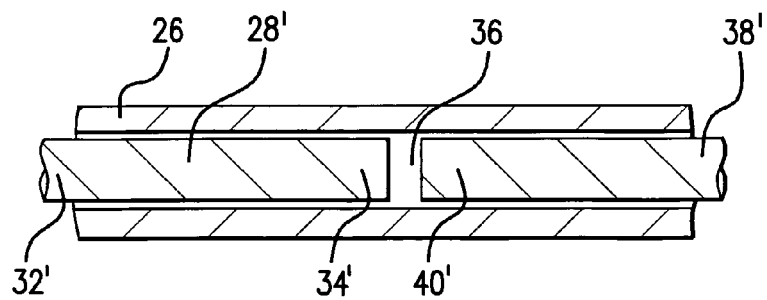
FIG. 5 shows a cross-sectional view of a portion of another embodiment of a preionization system having a preionization electrode that includes two elongated conductive members with each member having a substantially flat end.

FIG. 5 shows another embodiment of a preionization system having a preionization electrode 28' that includes an elongated conductive member 32'having a substantially flat end 34' that is disposed within the bore 36 of the dielectric tube 26. The electrode 28' also may include an elongated conductive member 38' having a substantially flat end 40' that is disposed within the bore 36 of the dielectric tube 26 and axially spaced from the end 34' of member 32'. This axial spacing allows for thermal expansion of the members 32', 38' without cracking the dielectric tube 26.

Figure 6:
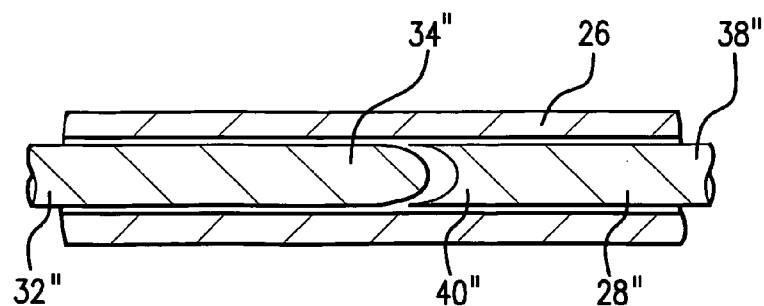
FIG. 6 shows a cross-sectional view of a portion of another embodiment of a preionization system having a preionization electrode that includes two elongated conductive members with one member having a concave end and the other member having a convex end.

FIG. 6 shows another embodiment of a preionization system having a preionization electrode 28" that includes an elongated conductive member 32" having a substantially concave end 34" that is disposed within the bore 36 of the dielectric tube 26. The electrode 28" also may include an elongated conductive member 38" having a substantially convex end 40" that is disposed within the bore 36 of the dielectric tube 26 and axially spaced from the end 34" of member 32". This axial spacing allows for thermal expansion of the members 32", 38" without cracking the dielectric tube 26.

Figure 7:
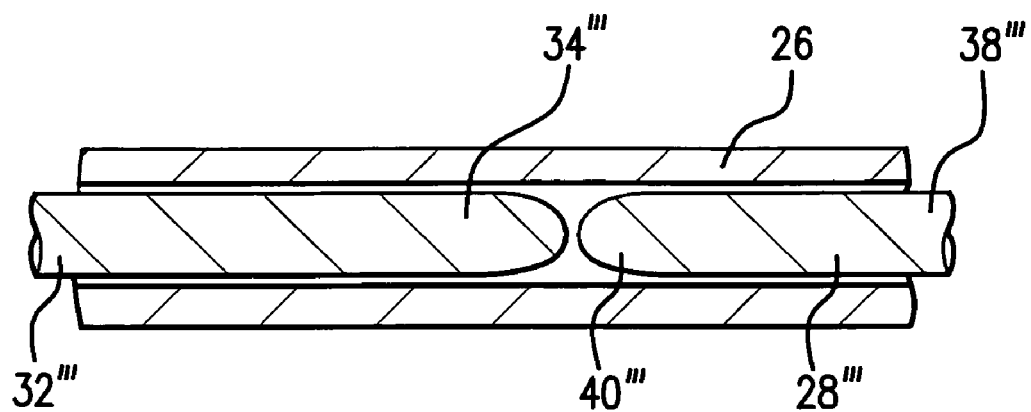
FIG. 7 shows a cross-sectional view of a portion of another embodiment of a preionization system having a preionization electrode that includes two elongated conductive members with each member having rounded edges.

FIG. 7 shows another embodiment of a preionization system having a preionization electrode 28'" that includes an elongated conductive member 32'" having a rounded end 34'" that is disposed within the bore 36 of the dielectric tube 26. The electrode 28'" also may include an elongated conductive member 38'" having a rounded end 40'" that is disposed within the bore 36 of the dielectric tube 26 and axially spaced from the end 34'" of member 32'". This axial spacing allows for thermal expansion of the members 32''', 38''' without cracking the dielectric tube 26.

OPERATION

Referring back to FIG. 1, in operation, a voltage is applied radially across the dielectric tube 26 to establish a pre-ionization emission prior to a discharge between main electrode 16 and main electrode 18. This voltage can be effectuated in one of several different ways. For example, a potential difference may be established between the preionization electrode 28 and a conductive shim 30, For this case, both members 32, 38 are typically held at a same voltage. As shown, the conducting shim 30 may be positioned between the tube 26 and main insulator 24 end may be elongated to extend substantially along the length of the dielectric tube 26. The conducting shim 30 may or may not be in electrical contact with the electrode 16. In some implementations, the members 32, 38 are electrically connected to the housing 12, which in turn, is connected to a reference potential, e.g. ground. The conducting shim 30 and / or one of the electrodes 16, 18 may then be biased relative to the reference potential to establish the voltage across the tube 26.

It will also be understood that, while only one preionization tube 26 is shown positioned upstream of the discharge electrodes 16, 18, other arrangements may be equally suitable depending on the application. For example, a preionization tube 26 may be positioned downstream of the discharge electrodes 16, 18 or a pair of preionization tubes 26 may be used, with one positioned upstream and the other positioned downstream of the discharge electrodes 16, 18.

While the particular aspects of embodiment(s) described and illustrated in this Pat. application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

What is claimed is:

1. A preionizer assembly for a gas discharge laser, said assembly comprising: a dielectric tube defining a tube bore; an electrode comprising: a first elongated conductive member, said first member having a first end and a second end with said first end of said first member disposed in said bore of said tube; and a second elongated conductive member, said second member having a first end and second end with said first end of said second member disposed in said bore and spaced from said first end of said first conductive member to establish an electrical gap therebetween, wherein said first and second conductive members are held at a same potential, and wherein at least a portion of said first member is formed as a rod defining a longitudinal axis and said first end of said first member is formed with a substantially cylindrical shaped opening aligned with said longitudinal axis.

2. A preionizer assembly as recited in claim 1 wherein said substantially cylindrical shaped opening has an inner diameter, D, and wherein said at least a portion of said second member is formed as a rod and said first end of said second member is formed with a substantially cylindrical shaped projection having outer diameter, d, with d<D.

3. A preionizer assembly as recited in claim 2 wherein said at least a portion of said substantially cylindrical shaped projection is disposed within said substantially cylindrical shaped opening.

4. A preionizer assembly as recited in claim 1 wherein said first and second members are electrically connected to a gas discharge chamber housing.

5. A preionizer assembly as recited in claim 1 wherein at least a portion of said first member is formed as a rod having diameter, $d_{rod}$, and said first end of said first member is formed as a substantially flat surface having diameter, $d_{rod}$.

6. A preionizer assembly as recited in claim 1 wherein at least a portion of said first member is formed as a rod and said first end of said first member is formed with a cavity having a concave inner surface and wherein at least a portion of said second member is formed as a rod and said first end of said second member is formed with a projection having a convex outer surface.

7. A preionizer assembly as recited in claim 6 wherein at least a portion of said projection is disposed within said cavity.

8. A preionizer assembly as recited in claim 1 wherein said tube is made of a ceramic material and said electrode is made of a brass.

9. A preionizer assembly as recited in claim 1 wherein said first end of said first member is rounded and said first end of said second member is rounded.

10. A preionizer assembly as recited in claim 1 wherein said dielectric tube has an outer surface and said assembly further comprises a conductor for connecting said outer surface to a discharge electrode of the gas discharge laser.

11. A gas discharge laser comprising:

a chamber housing:

a first elongated discharge electrode defining a longitudinal axis;

a second elongated discharge electrode spaced from said first electrode and aligned substantially parallel to said longitudinal axis;

a laserable gas medium within said housing;

a voltage source for establishing a potential difference between said first and second discharge electrodes to excite said gas medium;

a preionizer assembly comprising:

a dielectric tube defining a tube bore;

a preionizer electrode comprising;

a first elongated conductive member aligned substantially parallel to said longitudinal axis, at least a portion of said first member disposed in said bore of said tube; and a second elongated conductive member aligned substantially parallel to said longitudinal axis, at least a portion of said second member disposed in said bore and spaced from said first conductive member to establish an electrical gap therebetween.

12. A gas discharge laser as recited in claim 11 wherein at least a portion of said first member is formed as a rod and an end of said first member is formed with a substantially cylindrical shaped opening.

13. A gas discharge laser as recited in claim 12 wherein said substantially cylindrical shaped opening has an inner diameter, D, and wherein said at least a portion of said second member is formed as a rod and an end of said second member is formed with a substantially cylindrical shaped projection having outer diameter, d, with d<D.

14. A gas discharge laser as recited in claim 13 wherein said at least a portion of said substantially cylindrical shaped projection is disposed within said substantially cylindrical shaped opening.

15. A gas discharge laser as recited in claim 11 wherein said first and second members are electrically connected to the chamber housing.

16. An assembly for generating photons to ionize a gaseous material, said assembly comprising:

a dielectric tube defining a tube bore and an outer tube surface;

a preionizer electrode comprising;

a first elongated member aligned substantially parallel to said longitudinal axis, at least a portion of said first member disposed in said bore of said tube;

a second elongated conductive member aligned substantially parallel to said longitudinal axis, at least a portion of said second member disposed in said bore and spaced from said first conductive member to establish an electrical gap therebetween; and a voltage source establishing a potential difference between said preionizer electrode and a location on said outer tube surface to generate photons.

17. An assembly as recited in claim 16 wherein at least a portion of said first member is formed as a rod and an end of said first member is formed with a substantially cylindrical shaped opening.

18. An assembly as recited in claim 17 wherein said substantially cylindrical shaped opening has an inner diameter, D, and wherein said at least a portion of said second member is formed as a rod and an end of said second member is formed with a substantially cylindrical shaped projection having outer diameter, d, with d<D.

19. An assembly as recited in claim 18 wherein said at least a portion of said substantially cylindrical shaped projection is disposed within said substantially cylindrical shaped opening.

* * * * *